United States Patent
Cristiani

(10) Patent No.: US 7,381,933 B2
(45) Date of Patent: Jun. 3, 2008

(54) SYSTEM AND PROBE FOR DETECTING AT LEAST ONE PARAMETER

(75) Inventor: Corrado Cristiani, Modena (IT)

(73) Assignee: Angelo Po Grandi Cucine -- Societa' per Azioni, Carpi (IT)

( * ) Notice: Subject to any disclaimer, the term of this patent is extended or adjusted under 35 U.S.C. 154(b) by 62 days.

(21) Appl. No.: 11/185,982

(22) Filed: Jul. 21, 2005

(65) Prior Publication Data
US 2006/0016806 A1    Jan. 26, 2006

(30) Foreign Application Priority Data
Jul. 23, 2004   (IT)   .................. MO2004A0193

(51) Int. Cl.
    H05B 6/68       (2006.01)
    A47J 43/28      (2006.01)
(52) U.S. Cl. .............. 219/713; 219/710; 219/714; 219/516; 374/149; 374/155; 99/325
(58) Field of Classification Search ........ 219/702–714, 219/516, 510; 374/155, 141, 149; 340/870.16; 99/325, 342
See application file for complete search history.

(56) References Cited

U.S. PATENT DOCUMENTS

| 4,377,733 A | 3/1983 | Yamaguchi et al. |
| 4,475,024 A | 10/1984 | Tateda |

FOREIGN PATENT DOCUMENTS

| JP | 55 033656 A | | 3/1980 | |
| JP | 58-110930 | * | 7/1983 | .................. 219/707 |
| JP | 4-301390 | * | 10/1992 | .................. 219/707 |
| JP | 2000-97896 | * | 4/2000 | |

* cited by examiner

Primary Examiner—Philip H. Leung
(74) Attorney, Agent, or Firm—Nixon & Vanderhye P.C.

(57) ABSTRACT

A probe for detecting at least one parameter during thermal treatment of a food product comprises a sensor arrangement suitable for detecting a value of said at least one parameter, at least one antenna for communicating said value to a control device for controlling said thermal treatment in the absence of connection cables, and a supply arrangement of a different type from the electrochemical type.

43 Claims, 5 Drawing Sheets

SYSTEM AND PROBE FOR DETECTING AT LEAST ONE PARAMETER

The invention relates to a probe for detecting at least one parameter during a thermal treatment process of a food product, for example during a cooking process, freezing process or conservation process of such a product. The invention furthermore relates to a detecting system provided with the aforementioned probe and to a cooking apparatus and a conservation apparatus equipped with such a system.

Each parameter measured by the detecting system or the probe according to the invention may be a physical, mechanical or electric parameter such as for example temperature, impedance, humidity, pressure or density. Each parameter can be measured at one or more points arranged on the external surface or inside the food product, which may be of solid or liquid type.

Detecting system for detecting the temperature of a food product during a cooking process are known, comprising a probe that is suitable for measuring temperature and for generating a signal indicating the measured temperature value. These systems can also be used for detecting a parameter of the food product that is different from the temperature. The probe is connected by means of a connection cable to a control device, which enables the cooking process to be controlled on the basis of the value of the measured parameter, e.g. the temperature. By means of the connection cable it is possible to transmit to the control device the detected temperature value and to supply the probe and circuits contained therein.

The connection cable is responsible for numerous drawbacks during operation of the detecting system. In fact, this cable may be the cause of malfunctions or of unreliability in the system, inasmuch as because of its impedance it introduces a measuring error in the acquisition of the temperature. This error sometimes has to be corrected by using methods such as circuits or mathematical algorithms or other systems for the correction of systematic or random errors, which causes an increase in the complexity of the system and therefore an increase in the cost of making it.

Other drawbacks are connected with the overall dimensions of the connection cable, the length of which limits the mobility and/or the positioning of the probe inside the cooking chamber or on the cooking surface on which the process of cooking the food product occurs.

Furthermore, the connection cable may be broken or damaged during handling or positioning of the food product in the cooking chamber.

Lastly, impurities and dirt may get deposited on the connection cable increasing risk of food product contamination. For this reason, the cable needs to be cleaned frequently from dirt and from residue that result from previous cooking sessions.

Furthermore, systems for detecting temperatures are known and are used in the cooking industry to check that temperatures are kept sufficiently low during conservation and transportation of perishable food products. Such systems comprise a probe that is able to generate a signal that indicates the temperature of the product, which is stored in a non-volatile memory. The last one is associated by means of microcontroller circuit and transmission and reception devices with an antenna that enables remote communication with a control device through a radio-frequency signal. A battery or electrochemical accumulator integrated into the probe powers the probe and the electronic components associated with it.

The probes provided with an integrated battery are not suitable for being used in the detecting systems of the temperature during a cooking process inasmuch as the batteries are not able to ensure good performance when subjected to the high temperatures reached inside the cooking chamber.

Furthermore, batteries and accumulators are electrochemical supply devices that may chemically contaminate the food product that has to be thermally treated.

An object of the invention is to improve the probes for detecting parameters during thermal treatment of a food product.

A further object of the invention is to supply probes for detecting at least one parameter that do not have the drawbacks disclosed above connected with the presence of a connection cable between the probe and a control device outside it.

A still further object is to supply probes for detecting at least one parameter during thermal treatment of a food product that can be used with good results both during cooking processes and during freezing processes.

Another object of the invention is to provide probes for detecting at least one parameter of a food product that enables the risk of contamination of the product with substances that are foreign to it to be reduced.

According to the invention there is provided a probe for detecting at least one parameter during thermal treatment of a food product. This probe includes a sensor arrangement suitable for detecting a value of said at least one parameter, at least one antenna for communicating said value to a control device for controlling said thermal treatment in the absence of connection cables wherein said probe comprises a supply arrangement of a different type from the electrochemical type.

Owing to the invention, it is possible to obtain a probe for detecting at least one parameter during thermal treatment of a food product. This probe can be used both during thermal treatment at a temperature that is higher than ambient temperature and during thermal treatment at a temperature that is lower than ambient temperature. The probe, according to the invention, doesn't use the electrochemical supply arrangement that is not able to operate effectively at high temperatures.

Furthermore, the risk of contaminating the food product with the electrolyte contained in the batteries or in the accumulators of the known probes is eliminated.

By using this antenna, it is furthermore possible to avoid connection cable and also the drawbacks related to them and previously disclosed.

The invention will be better understood and carried out with reference to the attached drawings that illustrate some exemplifying and non-limiting embodiments thereof, in which.

Figure 1:
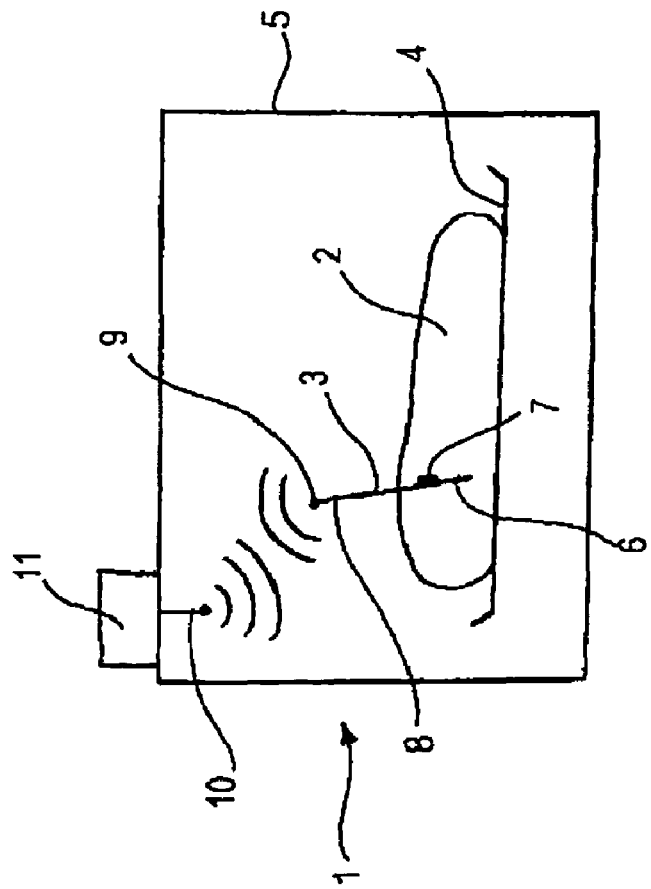
FIG. 1 is a schematic view of a system for detecting a parameter during a thermal-treatment cycle of a food product.

With reference to FIG. 1, there is shown a detecting system 1 for detecting the temperature of a food product 2 during a cooking process. The cooking process may occur inside an oven provided with a cooking chamber or in an apparatus devoid of a cooking chamber such as for example a cooking surface, a grill, a plate, a flame or a saucepan.

The system 1 can also be used for detecting a parameter of the food product 2 other than the temperature, for example impedance, humidity, pressure or density. The desired parameter can be measured during thermal treatment of the food product 2 like for example the cooking process. It also can be measured, during freezing treatment in the apparatuses commonly known as "temperature chillers", or during a process of conservation of the food product 2 using heated units or refrigerator and/or conserving appliances.

The detecting system 1 comprises a probe 3 having a pointed shape provided with a first end 6 suitable for being inserted into the food product 2. The latter rests on a cooking surface 4 arranged inside a cooking chamber 5. The probe 3 is equipped with a temperature sensor 7 arranged near the first end 6 in such a way that during use the sensor 7 is inside the food product 2.

At a second end 8 of the probe 3 opposite to the first end 6 there is arranged at least one antenna 9. This antenna 9 is used for exchanging signals in wireless mode with a further antenna 10. This antenna 10 is connected to a monitoring device or control unit 11, arranged in a fixed position on a support structure of the cooking chamber 5.

Figure 2:
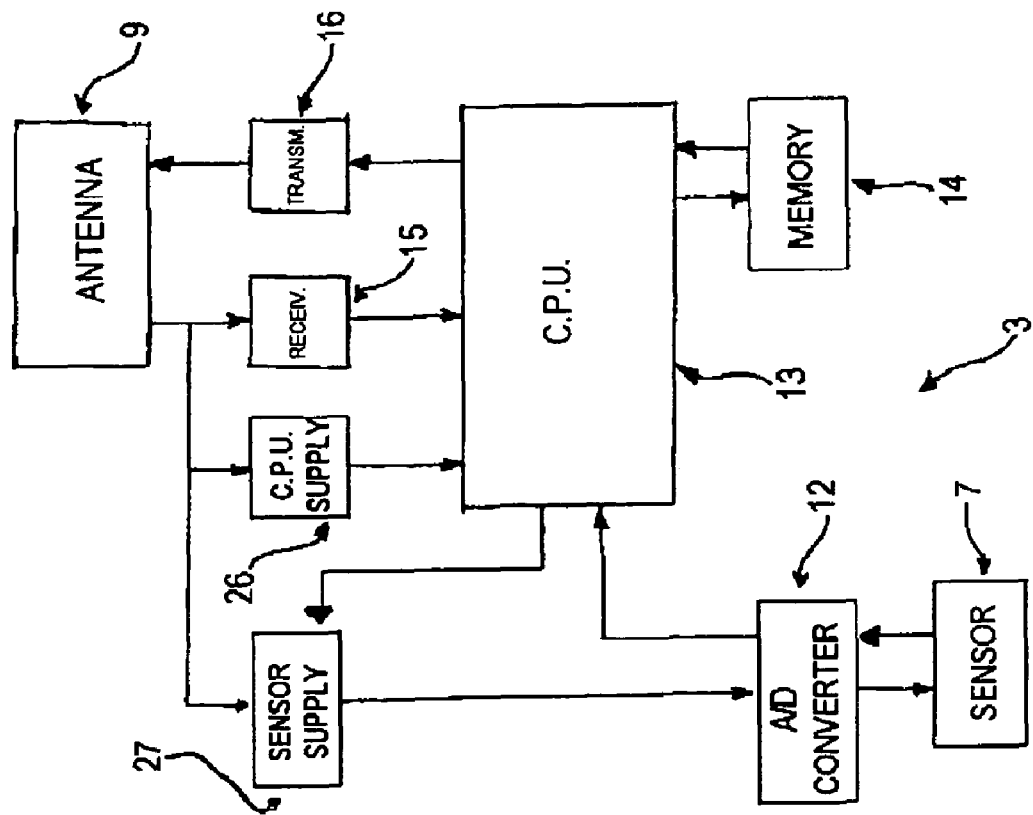
FIG. 2 is a block diagram showing the structure of a probe of the system in FIG. 1, according to a first version.

As shown in FIG. 2, this probe 3 comprises an analogue/digital converter 12 arranged to receive an analogue signal from the sensor 7 and convert it into digital form. The digital signal obtained thereby is then transmitted to a processing unit 13 inside which there is housed a processing logic that processes the signal. The processing unit 13 is connected to a non-volatile memory 14 onto which the processing unit 13 is able to write data and from which the processing unit 13 can read data.

The processing unit 13 is furthermore connected to the antenna 9 by the interposition of a receiving device 15 and a transmitting device 16. The receiving device 15 enables the processing unit 13 to receive radio-frequency signals from the control unit 11, through the antenna 9 and the further antenna 10. The transmitting device 16 on the other hand enables the processing unit 13 to transmit radio-frequency signals to the control unit 11, in ways that are similar to those used for receiving.

The probe 3 furthermore comprises a supply arrangement provided with a first supply circuit 26, suitable for receiving energy from the radio-frequency signal captured by the antenna 9 and for supplying the processing unit 13 with such energy. The supply arrangement furthermore also comprises a second supply circuit 27 suitable for receiving energy from the radio-frequency signal captured by the antenna 9 to supply the sensor 7 and the measuring circuits associated with it, in particular the analogue/digital converter 12. The first supply circuit 26 and the second supply circuit 27 are of the type commonly used in so-called "transponder" systems, which are widely used in identification and tracing systems.

During operation, the sensor 7 detects the temperature value at the desired point of the food product 2. To limit energy consumption by the probe 3, the temperature value is not detected continuously but only at given moments according to what is configured in the processing unit 13. In particular, the sensor 7 measures the temperature only when this measurement is necessary for controlling the cooking process and enough energy is present to power the sensor 7 and the measuring circuits connected thereto.

The value measured by the sensor 7 is converted into digital form by the converter 12 processed inside the processing unit 13 and then stored in the memory 14. When it is desired to know the temperature of the food product 2, the control unit 11, through the further antenna 10, sends a radio-frequency signal to the probe 3. The signal is captured by the antenna 9 and is transmitted to the processing unit 13 by the receiving device 15. The signal sent by the further antenna 10 is furthermore used by the first supply circuit 26, which transforms part of the electromagnetic energy associated with this signal into electric energy that enables the processing unit 13 and the components connected thereto to be supplied. By exploiting this source of energy, the processing unit 13 can write new data into the memory 14, or take data from the memory 14, process such data and rewrite the thus processed data into the memory 14. Furthermore, the processing unit 13 can select the datum of interest, for example the temperature value previously measured by the sensor 7, and send this datum to the control unit 11.

At the same time, the sensor 7, supplied by the second supply circuit 27, which is in turn controlled by the processing unit 13, can detect the current value of the temperature of the food product 2. This value can be stored in the memory 14 to be read up during a subsequent reading operation.

In an alternative version the processing unit 13 can send the temperature value read by the sensor 7 to the control unit 11, through the transmission device 16, without storing this value in the memory 14. In this case, the control unit 11 can use the measured temperature value to control the cooking process in real time.

The power necessary for reading the temperature value stored in the memory 14, for detecting a new temperature value and for writing into the memory 14 this new value is supplied directly by the signal received by the antenna 9 and stabilised in the supply circuits 26 and 27.

In this way, the use of batteries or other systems of electrochemical supply is avoided that would not be able to operate effectively in the presence of the high temperatures required by the cooking process.

The temperature value transmitted to the control unit 11 can be used by the latter to control the cooking process, for example to determine whether the food product 2 has reached a desired level of cooking and whether the moment has arrived to extract it from the oven.

Figure 7:
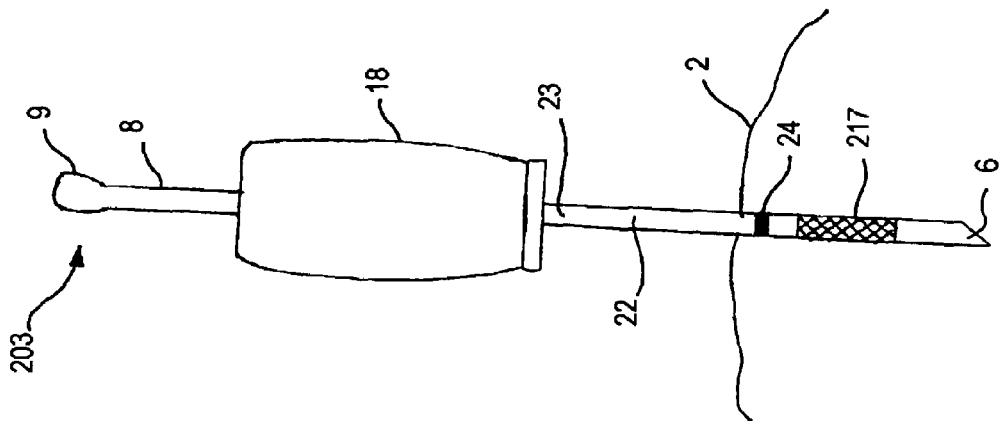
FIG. 7 is a schematic view of a probe according to the block diagram in FIG. 2.

The location of the components disclosed above inside the probe 3 is shown in FIG. 7, which shows the probe 3 in an operational configuration. As can be seen, the probe 3 comprises a pointed body 22 made for example of stainless steel, on which the first end 6 and a connection zone 23 are obtained, the connection zone 23 being positioned opposite the first end 6.

The pointed body 22 is connected, at the connection zone 23, with a grip 18 made of insulating material suitable for contact with food products, for example polytetrafluoroethylene (Teflon).

Near the first end 6 intended to be inserted into the food product 2, the probe 3 is equipped with an active zone 17 inside which there are housed the sensor 7, the analogue/digital converter 12, the processing unit 13, the memory 14, the first supply circuit 26, the second supply circuit 27, the receiving device 15 and the transmitting device 16. During a cooking process, the active zone 17 is arranged inside the food product 2, in such a way as to protect the components housed therein from the heat. The food product 2 is in fact at a lower temperature than the temperature in the cooking chamber 5.

The probe 3 may also comprise an alarm system provided with a sensor positioned near the active zone 17 and with alarm logic. The alarm logic generates an alarm signal managed by the control unit 11 when the temperature of the active zone 17 exceeds a limit value above which the electronic components housed therein could be damaged. The latter, once the alarm signal has been received, can alert the user to the danger of overheating of the active zone 17 or actively intervene to reduce the temperature of the active zone 17.

The antenna 9 is arranged near the second end 8 of the probe 3 and outside the food product 2, in such a way that the latter does not disturb reception of signals from and transmission of signals to the control unit 11.

To avoid excessive transmission of heat from the connection zone 23 of the pointed body 22 to the active zone 17 through the pointed body 22, which being metallic has great heat conductivity, it is possible to insert into the pointed body 22 an insulating section 24, namely an element made of a thermally insulating material. This enables transmission of heat from the inside of the cooking chamber 5 to the active zone 17 to be reduced.

The insulating section 24 can also be extended as far as the connection zone 23 and the grip 18. In such a way as to thermally insulate with greater efficacy the portion of probe 3 intended to be positioned inside the food product 2 from the further portion of probe 3 intended to remain outside the product.

In a version that is not shown the probe is equipped with a plurality of temperature sensors suitable for being positioned at different points of the food product. In this way, it is possible to measure the temperature at a plurality of points, which enables the cooking process to be controlled in a more precise manner and is particularly useful in the case of food products of relatively large dimensions.

In a further version, which is also not shown, it is possible to measure the temperature on the surface of the food product rather than inside it. The food product can furthermore be in a solid or liquid state.

In another version, the first supply circuit suitable for supplying the processing unit and the second supply circuit suitable for supplying the sensor can be integrated into a single supply circuit that is able to perform both these functions.

Figure 3:
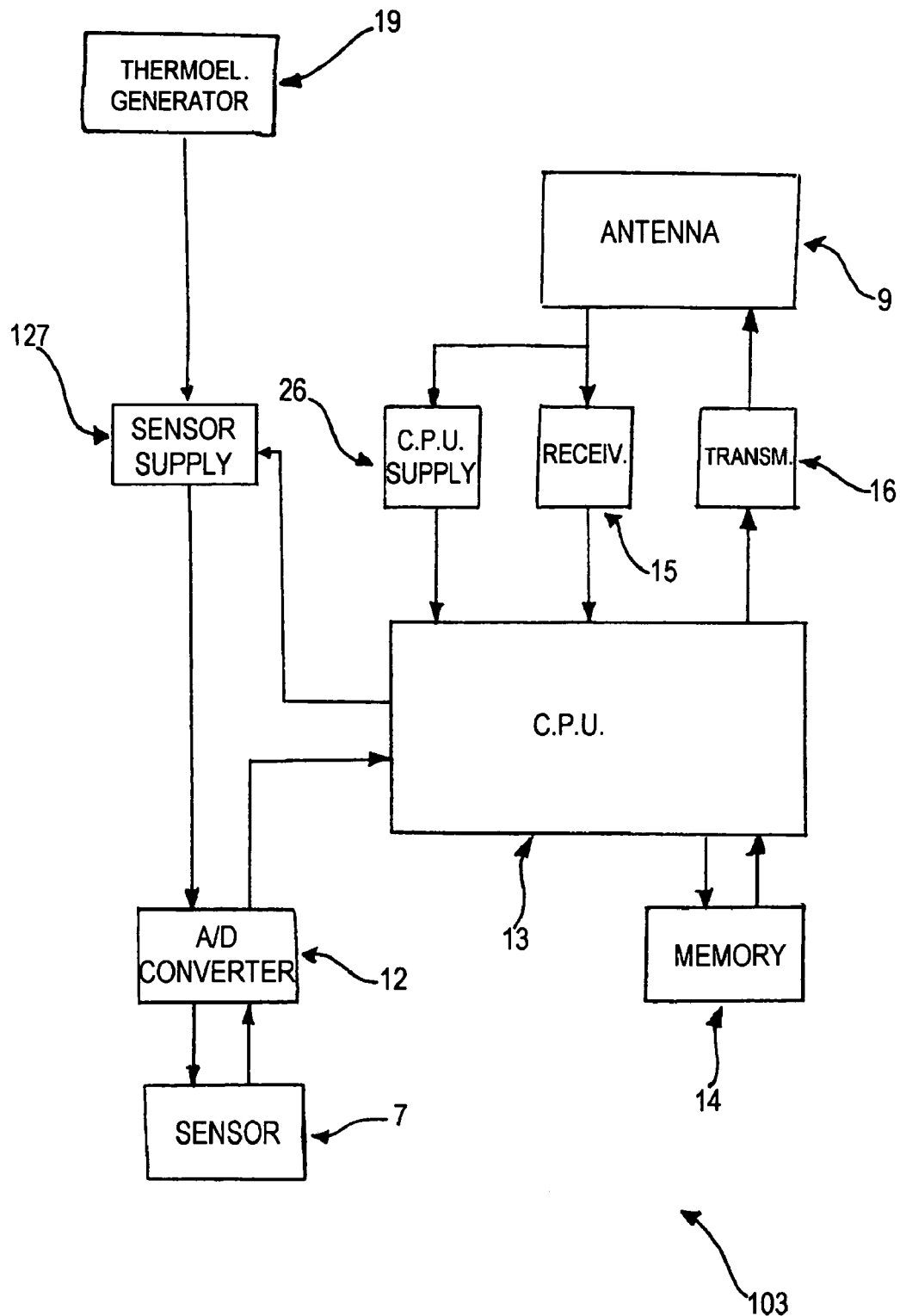
FIG. 3 is a block diagram like the one in FIG. 2, showing a probe according to a second version.

FIG. 3 shows a probe 103 according to a second embodiment, in which the components that are common with the probe 3 will be indicated by the same reference number already used previously, without being newly disclosed. The probe 103 can be used when the power obtainable from the radio-frequency signal is not enough to supply both the sensor 7 and the processing unit 13. For this purpose, the probe 103 is provided with a supply arrangement comprising an arrangement for transforming thermal energy into electric energy such as a thermoelectric generator 19. For example this supply arrangement can be a thermoelectric generator or a thermocouple connected to a supply circuit 127 arranged to supply the sensor 7 and the measuring circuit connected to it.

The thermoelectric generator 19 enables to exploit the heat that develops inside the oven in order to generate voltage that supplies the sensor 7 and the relative measuring circuit, so as to enable detection of the temperature in the food product 2. In particular, the supply circuit 127 is actuated only when the thermoelectric generator 19 make a quantity of energy available that is sufficient for operation of the sensor 7.

The processing unit 13, similarly to what has been disclosed with reference to FIG. 2, is on the other hand supplied by the radio-frequency signal received from the antenna 9 by means of the first supply circuit 26.

In an alternative version that is not shown the thermoelectric generator 19 can also be used to supply energy to the first supply circuit 26, which supplies the processing unit 13 and the circuits connected thereto. All the energy required for operation of the probe 103 then comes from the thermoelectric generator 19. The receiving device 15 performs the sole function of enabling the control unit 11 to send the probe 103 a signal with which the control unit 11 interrogates the probe 103 about the value of the current temperature.

In another alternative version, the thermoelectric generator 19 can be used to supply energy to the first supply circuit 26 in addition to the energy supplied by the radio-frequency signal. In this case, the thermoelectric generator 19 enables energy also to be supplied to the first supply circuit 26 in such a way that the processing unit 13 and the memory 14 can also operate when the antenna 9 does not receive the radio-frequency signal.

In a version that is not shown the two supply circuits 26 and 127 can be integrated into a single supply circuit that receives energy from the thermoelectric generator.

Figure 8:
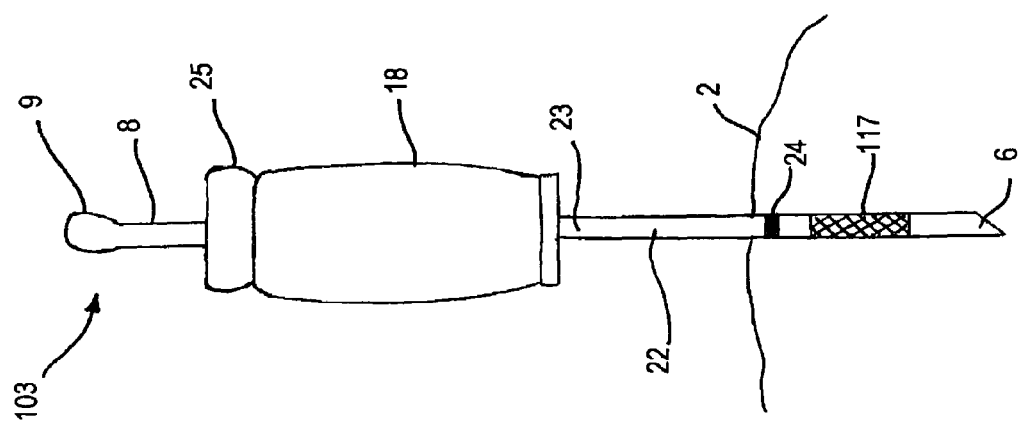
FIG. 8 is a schematic view of a probe according to the block diagram in FIG. 3.

As can be seen from FIG. 8, the probe 103 comprises an active zone 117 suitable for being positioned during use inside the food product 2. The active zone 117 comprises the sensor 7, arranged in the most suitable position to detect the parameter of interest, and the components that have to be protected from the heat, namely the analogue/digital converter 12, the memory 14, the receiving device 15, the transmitting device 16, the processing unit 13 and the supply circuits 26 and 127 that receive energy from the thermoelectric generator 19 and/or from the radio-frequency signal.

At least one portion of the thermoelectric generator 19 is positioned on the probe 103 in such a way as to remain outside the food product 2, for example near the second end 8. In such a way as to be in the zones of the oven that are at a higher temperature to be able to effectively obtain power from the heat. In the example in FIG. 8, this portion has been indicated by reference number 25 and is formed of thermally conductive material connected to the grip 18.

Figure 4:
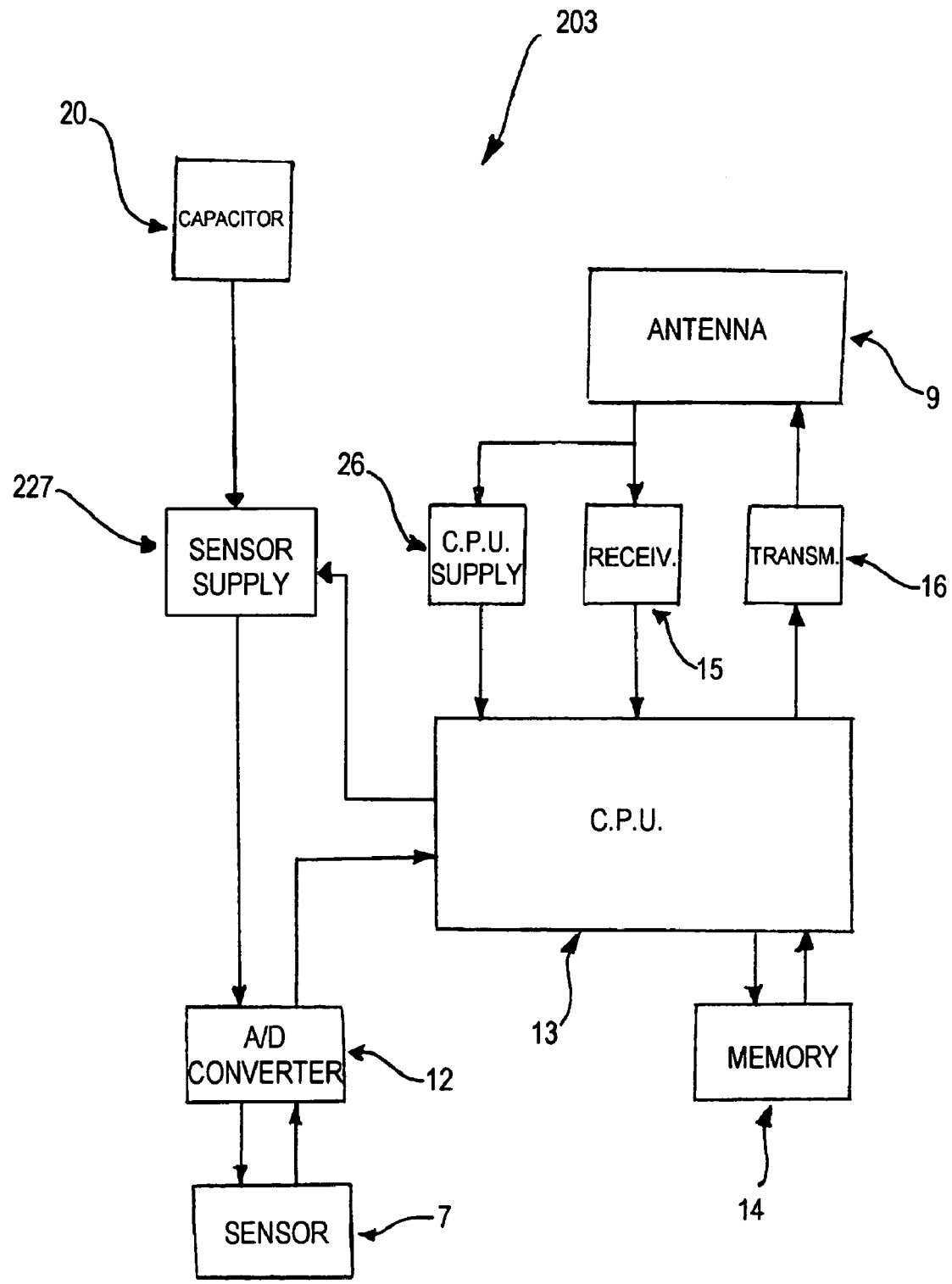
FIG. 4 is a block diagram like the one in FIG. 2, showing a probe according to a third version.

In a third constructional version shown in FIG. 4, there is provided a probe 203 supplied by a capacitor 20, connected to a supply circuit 227 arranged to supply the sensor 7 and the relative measuring circuits. The capacitor 20 can be recharged with an external charger during the night and more in general in periods in which the oven is not used. During the recharging operation, inside the capacitor 20 a certain quantity of electric charge is stored. That electric charge can be used during the cooking process to supply a few times the sensor 7 and the circuit associated therewith, in such a way as to enable detection of the temperature and its transmission to the control unit 11, even when the energy obtainable from the radio-frequency signal would not otherwise be sufficient. In particular, the supply circuit 227 is actuated only when inside the capacitor 20 a quantity of energy is stored that is sufficient for operation of the sensor 7.

The probe 203 provided with the capacitor 20 can be used both during the cooking processes and during the freezing processes, because the capacitor 20 acts efficiently both in the presence of relatively high temperatures and in the presence of relatively low temperatures.

The capacitor 20 can also be connected to the first supply circuit 26 that receives energy from the radio-frequency signal and supplies the processing unit 13. In this case, the capacitor 20 enables the processing unit 13 to be supplied even in the absence of the radio-frequency signal.

Figure 9:
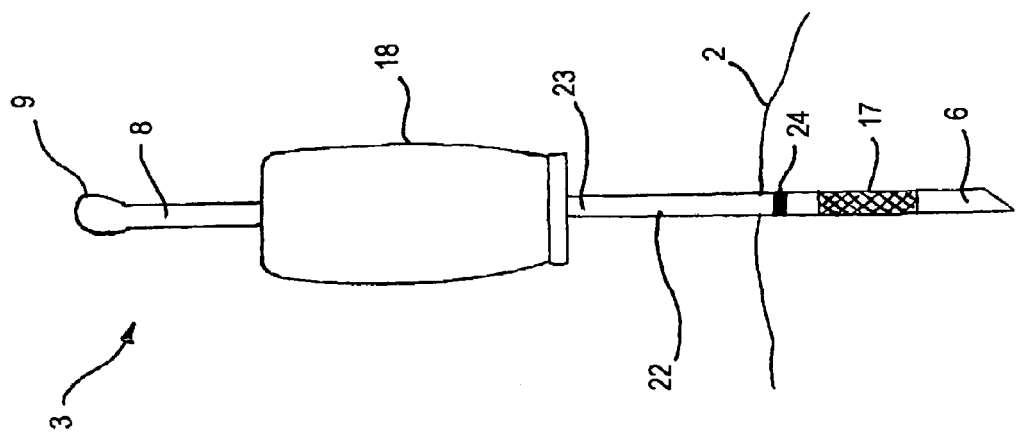
FIG. 9 is a schematic view of a probe according to the block diagram in FIG. 4.

As shown in FIG. 9, the probe 203 comprises an active zone 217 arranged near the first end 6 and suitable for being positioned inside the food product 2. In the active zone 217 there are housed the sensor 7 near the point at which it is desired to detect the parameter of interest, the analogue/digital converter 12, the processing unit 13, the memory 14, the supply circuits 26 and 227, the receiving device 15 and the transmitting device 16. In a sufficiently cold zone near the active zone 17 there is furthermore arranged the capacitor 20, which can in this way be protected from the higher temperatures that are generated in the cooking chamber 5 outside the food product 2.

In an alternative version that is not shown, the supply circuits 26 and 227 can be integrated into a single supply circuit connected to the capacitor 20. The single supply circuit in this case provides energy both to the sensor and to the processing unit.

In another version, the capacitor 20 can be housed inside the grip 18.

Figure 5:
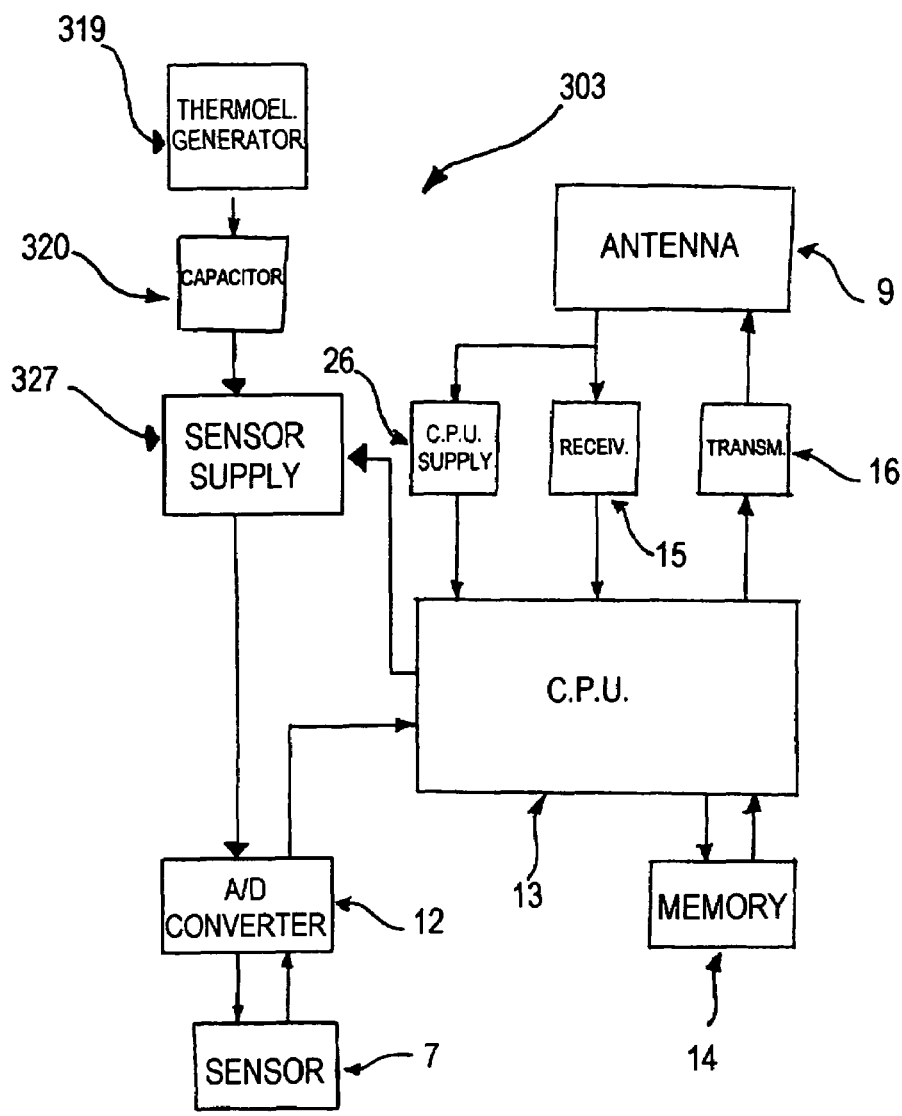
FIG. 5 is a block diagram like the one in FIG. 2, showing a probe according to a fourth version.

FIG. 5 shows a probe 303 according to a further constructional version. The probe 303 is provided with a supply arrangement comprising a capacitor 320 and a thermoelectric generator 319, for example a thermocouple. The capacitor 320 and the thermoelectric generator 319, in combination or as alternatives to one another, enable energy to be supplied to a supply circuit 327 that supplies the sensor 7 and the measuring circuits connected thereto.

In particular, as already disclosed with reference to FIG. 3, the thermoelectric generator 319 enables the thermal energy of the oven to be used to supply the sensor 7 and the relative measuring circuits. The capacitor 320 on the other hand, as already disclosed with reference to FIG. 4, can be recharged by means of an external charger before starting the cooking or refrigeration process. The accumulated charge in the capacitor 320 can be used to supply the sensor 7 and the relative measuring circuits, even when the thermoelectric generator 319 is not able to supply enough energy.

Furthermore, when the thermoelectric generator 319 is able to supply a greater quantity of energy than that consumed by the probe 303, it can also be used to recharge the capacitor 320.

The thermoelectric generator 319 can thus supply the energy required to operate the probe 303 if the capacitor 320 runs down during thermal treatment.

Figure 6:
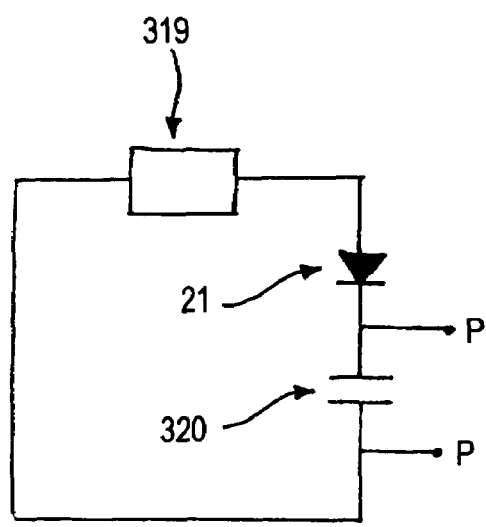
FIG. 6 illustrates a schematic portion of a circuit of the probe in FIG. 5.

FIG. 6 exemplifies how the thermoelectric generator 319 and the capacitor 320 can be connected together, after which the processing unit 11 can be connected to the capacitor 320 at the points P so as to obtain from said capacitor and from the thermoelectric generator 319 the energy required to operate it. Between the thermoelectric generator 319 and the capacitor 320 there has been shown a correcting diode 21 that schematises the possibility of regulation of the current inside the circuit in the required direction, namely from the thermoelectric generator 319 to the capacitor 320.

The structure of the probe 303 is similar to that shown in FIGS. 7 to 9; in particular, the capacitor 320 is arranged in the active zone intended to be positioned inside the food product, whereas at least a pole of the thermoelectric generator 319 is located near the antenna 9, so as to remain operationally outside the food product.

The invention claimed is:

1. Probe for detecting at least one parameter during thermal treatment of a food product, comprising a sensor arrangement suitable for detecting a value of said at least one parameter, at least one antenna for communicating said value to a control device for controlling said thermal treatment in the absence of connection cables, wherein said probe comprises a supply arrangement comprising a supply circuit arrangement suitable for transforming into electric energy electromagnetic energy associated with a signal transmitted to said at least one antenna by said control device, said supply circuit arrangement comprising a supply circuit connected to said sensor arrangement and a further supply circuit connected to a processing unit suitable for processing said value, said probe further comprising an activating device for selectively activating said supply circuit at certain preset instants, a non-volatile memory that is readable and/or writeable by said processing unit and an analogue/digital converter suitable for converting said at least one parameter into digital form to transmit it to said processing unit, said processing unit being positioned in an active zone arranged near a pointed end of said probe suitable for interacting with said food product.

2. Probe according to claim 1, wherein said activating device is programmed in such a way as to activate said supply circuit at the request of said control device.

3. Probe according to claim 1, wherein said supply circuit and said further supply circuit are integrated in a single supply circuit.

4. Probe according to claim 1, wherein said memory is positioned in said active zone.

5. Probe according to claim 1, wherein said analogue/digital converter is positioned in said active zone.

6. Probe according to claim 1, wherein with said at least one antenna there is associated a receiving device suitable for receiving a signal from said control device and positioned in said active zone.

7. Probe according to claim 1, wherein with said at least one antenna there is associated a transmitting device suitable for transmitting a signal to said control device and positioned in said active zone.

8. Probe according to claim 1, wherein said at least one antenna is positioned near a further end of said probe, said further end being opposite said pointed end.

9. Probe according to claim 8, wherein between said further end and said active zone there is interposed a thermally insulating material.

10. Probe according to claim 9, wherein said thermally insulating material is interposed between a grip of said probe and said active zone.

11. Probe according to claim 10, wherein said supply arrangement comprises at least one capacitor.

12. Probe according to claim 11, wherein said at least one capacitor is positioned near said active zone.

13. Probe according to claim 11, wherein said capacitor is positioned in said grip.

14. Probe according to claim 11, wherein said capacitor is connected to said supply circuit to supply said supply circuit.

15. Probe according to claim 14, wherein said activating device is programmed in such a way as to activate said supply circuit when in said capacitor there is stored sufficient quantity of energy to supply said sensor arrangement.

16. Probe according to claim 11, wherein said capacitor is connected to said further supply circuit to supply said further supply circuit.

17. Probe according to claim 1, wherein with said active zone there is associated an alarm system suitable for generating an alarm signal when the temperature of said active zone exceeds a limit value.

18. Probe according to claim 17, wherein said alarm system comprises a sensor positioned near said active zone and alarm logic suitable for managing the data coming from said sensor.

19. Probe according to claim 1, wherein said sensor arrangement comprises a sensor to detect said at least one parameter at a point of said food product.

20. Probe according to claim 1, wherein said sensor arrangement comprises a plurality of sensors to detect said at least one parameter in a plurality of points of said food product.

21. Probe according to claim 1, wherein said sensor arrangement comprises a temperature sensor.

22. Probe according to claim 1, wherein said sensor arrangement comprises a sensor for detecting impedance.

23. Probe according to claim 1, wherein said sensor arrangement comprises a sensor for detecting humidity.

24. Probe according to claim 1, wherein said sensor arrangement comprises a sensor for detecting pressure.

25. Probe according to claim 1, wherein said sensor arrangement comprises a sensor for detecting density.

26. System for detecting at least one parameter during thermal treatment of food product, comprising a probe according to claim 1, and a control device suitable for receiving a value of said at least one parameter from said probe by a communication device devoid of connection cables to control said thermal treatment.

27. Apparatus for cooking a food product, comprising a system according to claim 26 for detecting at least one parameter of said food product during cooking.

28. Apparatus for conserving a food product, comprising a system according to claim 26 for detecting at least one parameter during conserving.

29. Probe for detecting at least one parameter during thermal treatment of a food product, comprising a sensor arrangement suitable for detecting a value of said at least one parameter, at least one antenna for communicating said value to a control device for controlling said thermal treatment in the absence of connection cables, wherein said probe comprises a supply arrangement suitable for transforming thermal energy into electric energy, said supply arrangement comprising a supply circuit connected to said sensor arrangement and a further supply circuit connected to a processing unit suitable for processing said value, said probe further comprising an activating device for selectively activating said supply circuit at certain preset instants, a non-volatile memory that is readable and/or writeable by said processing unit and an analogue/digital converter suitable for converting said at least one parameter into digital form to transmit it to said processing unit, said processing unit being positioned in an active zone arranged near a pointed end of said probe suitable for interacting with said food product.

30. Probe according to claim 29, wherein said arrangement for transforming thermal energy into electric energy is selected from a group consisting of: a thermocouple, a thermoelectric generator.

31. Probe according to claim 29, wherein said arrangement for transforming thermal energy into electric energy is equipped with a pole positioned in a region of said probe intended to remain operationally outside said food product.

32. Probe according to claim 31, wherein said region is arranged near said at least one antenna.

33. Probe according to claim 29, wherein said supply arrangement for transforming thermal energy into electric energy is connected to a capacitor.

34. Probe according to claim 33, wherein between said arrangement for transforming thermal energy into electric energy and said capacitor there is interposed a rectifying device.

35. Probe according to claim 29, wherein said activating device is programmed in such a way as to activate said supply circuit when said arrangement for transforming thermal energy into electric energy is able to supply enough energy to supply said sensor arrangement.

36. Probe according to claim 29, wherein said sensor arrangement comprises a sensor to detect said at least one parameter at a point of said food product.

37. Probe according to claim 29, wherein said sensor arrangement comprises a plurality of sensors to detect said at least one parameter in a plurality of points of said food product.

38. Probe according to claim 29, wherein said sensor arrangement comprises a temperature sensor.

39. Probe according to claim 29, wherein said sensor arrangement comprises a sensor for detecting impedance.

40. Probe according to claim 29, wherein said sensor arrangement comprises a sensor for detecting humidity.

41. Probe according to claim 29, wherein said sensor arrangement comprises a sensor for detecting pressure.

42. Probe according to claim 29, wherein said sensor arrangement comprises a sensor for detecting density.

43. System for detecting at least one parameter during thermal treatment of food product, comprising a probe according to claim 29, and a control device suitable for receiving a value of said at least one parameter from said probe by a communication device devoid of connection cables to control said thermal treatment.

* * * * *